United States Patent [19]
Basu

[11] Patent Number: 5,832,016
[45] Date of Patent: Nov. 3, 1998

[54] SLAB LASER ASSEMBLY

[75] Inventor: Santanu Basu, Rancho Palos Verdes, Calif.

[73] Assignee: Northrop Grumman Corporation, Los Angeles, Calif.

[21] Appl. No.: 791,063

[22] Filed: Jan. 29, 1997

[51] Int. Cl.⁶ .................................................. H01S 3/04
[52] U.S. Cl. ............................................................ 372/36
[58] Field of Search ........................................ 372/34, 36

[56] References Cited

U.S. PATENT DOCUMENTS

| | | | |
|---|---|---|---|
| 3,522,552 | 8/1970 | Willmott | 331/94.5 |
| 3,962,655 | 6/1976 | Selway et al. | 331/94.5 |
| 4,660,275 | 4/1987 | Lo | 29/569 |
| 4,949,346 | 8/1990 | Kuper et al. | 372/36 |
| 5,008,737 | 4/1991 | Burnham et al. | 357/81 |
| 5,099,488 | 3/1992 | Ahrabi et al. | 372/361 |
| 5,181,214 | 1/1993 | Berger et al. | 372/34 |
| 5,267,252 | 11/1993 | Amano | 372/34 |
| 5,311,530 | 5/1994 | Wagner et al. | 372/36 |
| 5,329,539 | 7/1994 | Pearson et al. | 372/36 |
| 5,341,391 | 8/1994 | Ishimura | 372/46 |
| 5,355,382 | 10/1994 | Kovacs et al. | 372/36 |
| 5,363,391 | 11/1994 | Matthews et al. | 372/36 |
| 5,394,427 | 2/1995 | Mc Minn et al. | 372/35 |
| 5,479,430 | 12/1995 | Shine et al. | 372/36 |

*Primary Examiner*—Rodney B. Bovernick
*Assistant Examiner*—Robert E. Wise
*Attorney, Agent, or Firm*—Terry J. Anderson; Karl J. Hoch, Jr.

[57] ABSTRACT

A heat sink for slab lasers has two heat conductive members. Each heat conductive member has a generally planar surface and is configured such that a solid state laser medium is disposable therebetween while contacting the planar surfaces thereof. There is at least one window formed in at least one of the heat conductive members for facilitating pumping of the solid state laser medium. The two heat conductive members cause heat to be removed from the solid state laser medium in a manner which mitigates thermal focusing and depolarization of laser radiation stimulated within the solid state laser medium.

13 Claims, 3 Drawing Sheets

SLAB LASER ASSEMBLY

FIELD OF THE INVENTION

The present invention relates generally to solid state lasers and more particularly to a heat sink for slab lasers which causes heat to be removed therefrom in a manner which mitigates thermal focusing and depolarization of laser radiation stimulated within the solid state laser medium while also facilitating multiplexing of the pumping lasers which stimulate emission within the solid state laser medium.

BACKGROUND OF THE INVENTION

Solid state laser media which are stimulated into emission via pumping with diode lasers are well known. Such solid state laser media may either be end pumped or side pumped. In end pumping, either one or two diode lasers pump a solid state laser medium via the ends thereof. In side pumping, one or more diode lasers pump a solid state laser medium through the side(s) thereof.

As those skilled in the art will appreciate, one advantage of end pumping is that pumping efficiency is enhanced since the pumping radiation is more nearly in line with the output beam of the solid state laser medium. Such on-axis pumping inherently provides a high ratio of absorption/geometric cross-section of the pumped region and also potentially facilitates efficient overlap of the low order spatial modes of the solid state laser medium.

However, in end pumping, the number of diode lasers is limited to a maximum of two, i.e., one for pumping each end of the solid state laser medium. It is frequently desirable to enhance the output power of the solid state laser medium by providing more pumping thereto than is possible via such end pumping. This necessitates the use of side pumping, wherein more than two diode lasers may be utilized to pump the solid state laser medium.

According to contemporary construction, a side pumped solid state laser comprises a laser medium, typically comprised of a crystalline material such as Nd:YAG, aligned within a laser resonator, i.e., a pair of parallel mirrors, and configured to be side pumped via a plurality of diode lasers so as to effect the generation of a laser beam within the laser medium. The laser beam is reflected between the two mirrors of the resonator. The laser beam so generated within the solid state laser medium is output through one or both of the mirrors of the resonator.

A longitudinal axis is defined along the length of the solid state laser medium, which is typically configured in the form of a rod. Transverse directions are defined radially with respect to the rod-shaped laser medium. The longitudinal axis generally defines the optical axis of the laser medium.

The solid state laser medium may be pumped from either one side or both sides thereof, as desired. It is generally desirable to pump the solid state laser medium from two opposite sides thereof, since such configuration provides more room for the diode lasers. However, as those skilled in the art will appreciate, such side pumped solid state lasers suffer from substantially reduced efficiency due to transverse temperature gradients which occur within the solid state laser medium of contemporary devices.

The problems associated with heat dissipation become particularly apparent as the average output power from such devices is increased. As those skilled in the art will appreciate, such transverse temperature gradients contribute to undesirable focusing and depolarization of the laser beam within the solid state laser medium. Optimal average single-mode power is obtained by providing a single-mode geometrical cross-sectional area and overlapping the pumped beam to this area.

As those skilled in the art will appreciate, maximum efficiency, and therefore maximum output power, is attained when the excitation wavelength of the excitation laser beam, i.e., the outputs of the laser diodes are matched to the absorption wavelength or an absorption band of the solid state laser medium. Thus, if the excitation wavelength of the laser diodes is not equal to the absorption wavelength of the solid state laser medium, then the oscillation efficiency of the output laser beam is substantially degraded.

In an attempt to mitigate the problem of inefficiency associated with transverse thermal gradients, various convective cooling methodologies have been developed. According to each of such convective cooling methodologies, a liquid or gas is caused to flow along the faces of the solid state laser medium. However, although it has been found that such convective cooling does significantly increase the power handling capacity of the solid state laser medium, it does not tend to eliminate transverse thermal gradients. Therefore it does not provide optimal performance.

In a further attempt to increase the power handling capacity of the solid state laser medium, mechanical motion of the pumping radiation source relative to the solid state laser medium to effect regeneration thereof has been performed. According to such contemporary methodology, the pumping source is typically moved along the length of the solid state laser medium, so as to mitigate overheating of any particular portion thereof. However, as those skilled in the art will appreciate, such mechanical motion of the pumping source relative to the solid state laser medium involves sophisticated mechanical design and a large size laser medium of good optical quality.

As such, it is highly desirable to maintain the temperature of the solid state laser medium such that it is uniform throughout and does not vary substantially over time during operation thereof.

SUMMARY OF THE INVENTION

The present invention specifically addresses and alleviates the above-mentioned deficiencies associated with the prior art. More particularly, the present invention comprises a heat sink for slab lasers, the heat sink comprising two heat conductive members, each heat conductive member having a generally planar surface. The two heat conductive members are configured such that a solid state laser medium is disposable therebetween while contacting the planar surfaces thereof.

At least one window is formed in at least one of the two heat conductive members so as to facilitate pumping of the solid state laser medium therethrough. The solid state laser medium is typically pumped with one or more diode lasers or the like.

The two heat conductive members cause heat to be removed from the solid state laser medium in a manner which mitigates thermal focusing and depolarization of the laser radiation stimulated within the solid state laser medium.

The heat conductive members preferably comprise metal heat conductive members, preferably aluminum. Those skilled in the art will appreciate that various different heat conductive materials are suitable for conducting heat away from the solid state laser medium.

The generally planar surface of each heat conductive member is preferably machined so as to provide a very flat surface, thus insuring desirable mechanical contact with the solid state laser medium. Preferably, the generally planar surface of each heat conductive member is polished, so as to further enhance heat transfer at the interface thereof with the solid state laser medium.

Optionally, a conformable, heat conductive material is disposed intermediate the solid state laser medium and the heat conductive members. The conformable, heat conductive material preferably comprises a layer of indium. As those skilled in the art will appreciate, the indium layer conforms to both the generally planar surface of each heat conductive member and the complimentary surfaces of the solid state laser medium. Thus, as the heat conductive members and the solid state laser medium are urged into contact with one another, the indium layer disposed therebetween tends to flow or deform, so as to fill any voids therebetween, thus providing enhanced heat flow at the interface of the solid state laser medium and the heat conductive members.

According to the preferred embodiment of the present invention, a mirrored surface is formed upon each heat conductive member and is configured to reflect pumping radiation transmitted through the windows and the solid state laser medium back through the solid state laser medium, so as to enhance the pumping thereof. Preferably, such a mirrored surface comprises gold deposited upon one of the heat conductive members which is on the opposite side of the solid state laser medium from the other heat conductive member having a window formed therein. In this manner, one mirror is typically formed opposite each window.

The two heat conductive members are configured so as to facilitate heat flow through at least the active portion of the solid state laser medium, i.e., that portion in which lasing occurs, in a manner which mitigates heat gradients within the active portion. As those skilled in the art will appreciate, minimizing such heat gradients similarly minimizes (a) stresses and (b) changes in the refractive index of the solid state laser medium, thereby mitigating thermal focusing and depolarization of the stimulated laser radiation within the solid state laser medium.

Thus, according to the methodology of the present invention, the solid state laser medium is pumped through at least one window formed in at least one of the two heat conductive members. Heat is then removed from the solid state laser medium via two heat conductive members which cause the formation of heat flow paths through the solid state laser medium in a direction which is generally perpendicular to the optical axis of the solid state laser medium and is generally uniform along the optical axis thereof so as to mitigate temperature gradients throughout the solid state laser medium.

In this manner, higher average output power may be attained since the undesirable effects of thermal focusing and depolarization due to temperature gradients are mitigated. Further, according to the present invention, a plurality of diode lasers or the like may be utilized to pump the solid state laser medium, so as to attain such increased average output power therefrom.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENTS

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
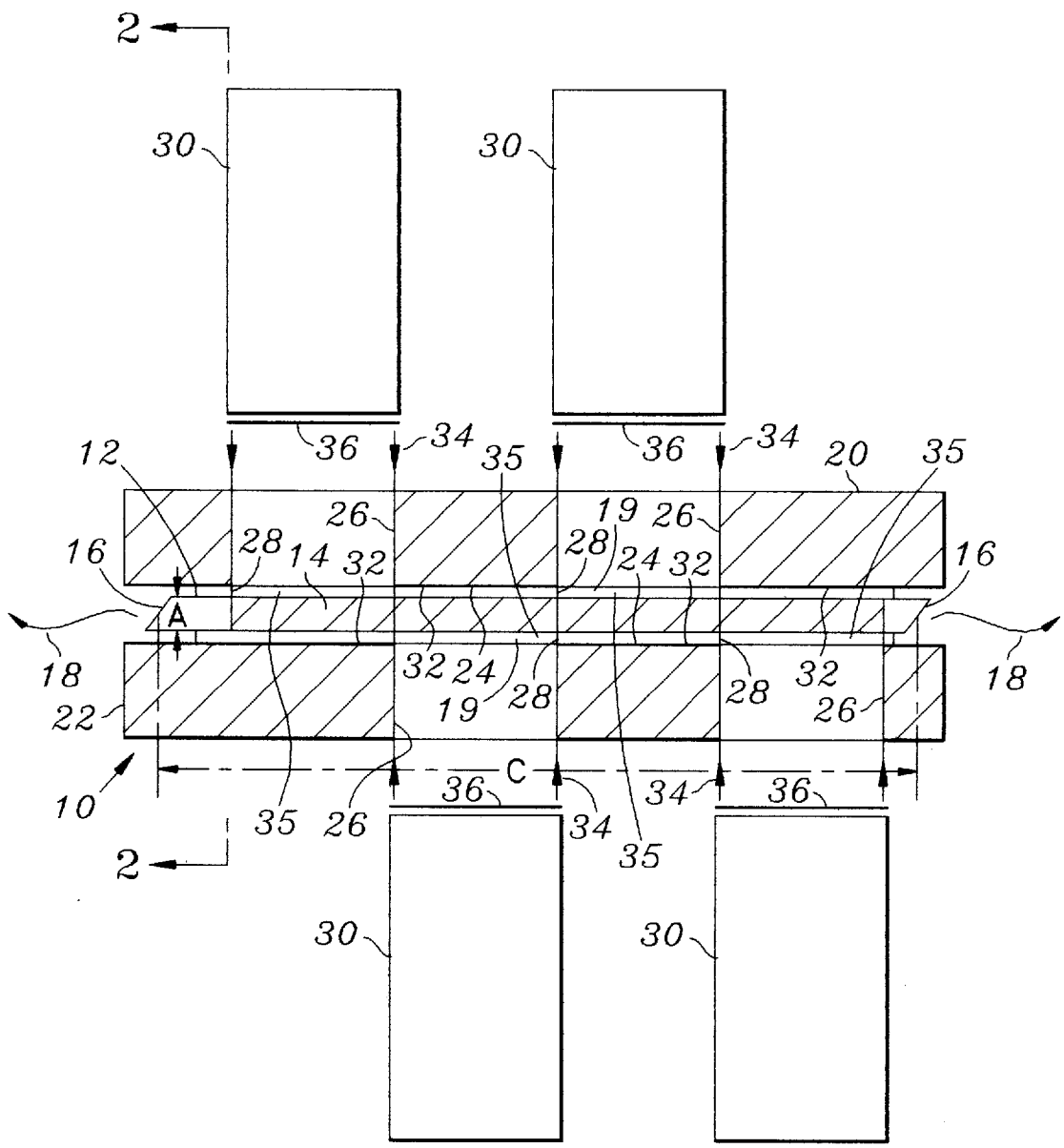
FIG. 1 is a side view of a slab laser assembly of the present invention, having two heat sinks or heat conductive members formed to opposite sides of the solid state laser medium, so as to conduct heat away from the active portion thereof in a manner which minimizes thermal gradients within the active portion of the solid state laser medium.
Figure 2:
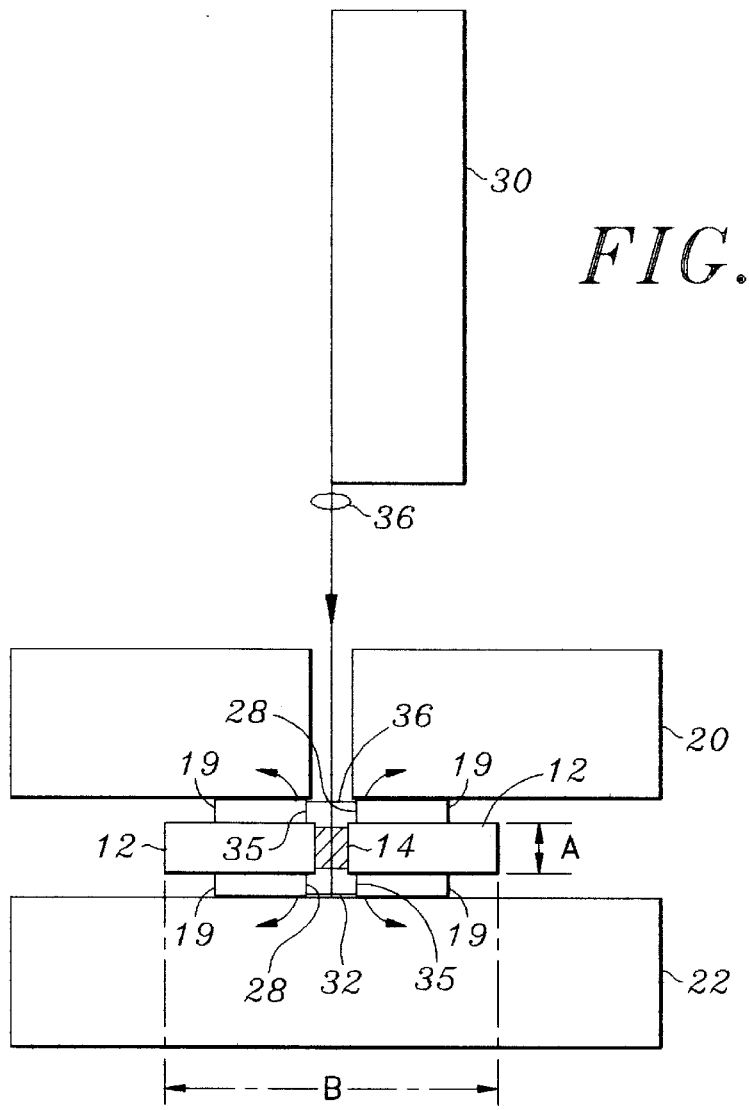
FIG. 2 is a cross-sectional view of the slab laser assembly taken along line 2 of FIG. 1.
Figure 3:
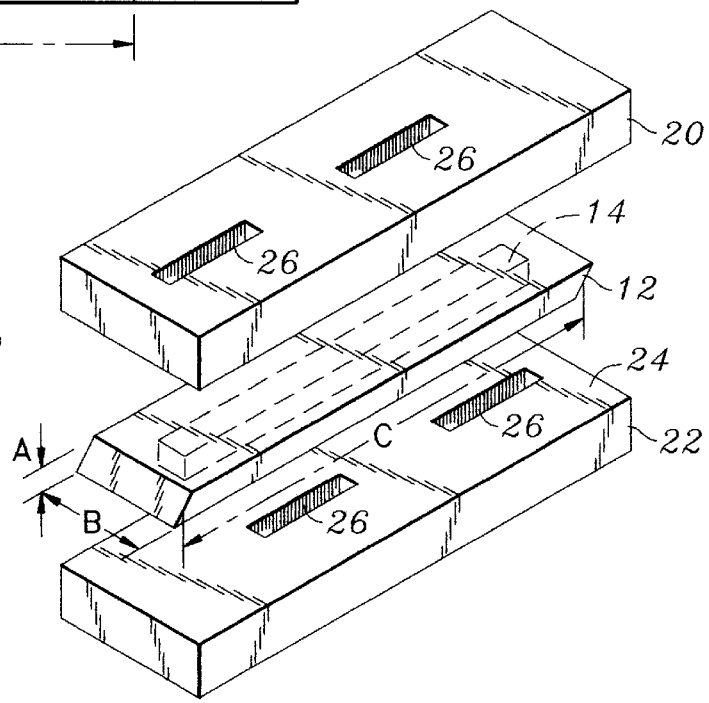
FIG. 3 is an exploded perspective view of the slab laser assembly of the FIG. 1 showing the first and second heat conductive members thereof positioned away from the solid state laser medium.

The slab laser assembly of the present invention is illustrated in FIGS. 1–3 which depict a presently preferred embodiment thereof. Referring now to FIGS. 1–3, the slab laser assembly 10 generally comprises solid state laser medium 12 having an active portion 14 (best shown in FIG. 3) thereof. The active portion 14 of the solid state laser medium 12 is that portion of the solid state laser medium 12 which is irradiated or pumped, so as to produce lasing action within the solid state laser medium 12. The ends of the solid state laser medium 12 preferably comprise Brewster angle bevels 16, so as to provide output beams 18 having substantially a single polarization. As those skilled in the art will appreciate, the slab or solid state laser medium 12 has a height, Dimension A; a width, Dimension B; and a length, Dimension C; the width, Dimension B, typically being substantially greater than the height, Dimension A.

Disposed above and below the solid state laser medium 12 and capturing the solid state laser medium 12 therebetween are first 20 and second 22 heat conductive members or heat sinks. Each heat conductive member 20, 22 comprises an inboard or solid state laser medium contacting surface 24 which is formed complimentary to the solid state laser medium 12, so as to provide good thermal contact therewith. In order to facilitate such good thermal contact of the first 20 and second 22 heat conductive members with the solid state laser medium 12, the inboard surfaces 24 are machined flat, and preferably polished, so as to be generally complimentary to the corresponding flat surfaces of the solid state laser medium 12 and also so as to mitigate the occurrence of voids or air gaps between the first 20 and second 22 heat conductive members and the solid state laser medium 12.

Optionally, layers of indium 19 are disposed intermediate the first 20 and second 22 heat conductive members and the solid state laser medium 12, so as to fill in any voids therebetween, thereby enhancing heat conductivity between the solid state laser medium 12 and the first 20 and second 22 heat conductive members.

Windows 26 formed in the first 20 and second 22 heat conductive members and complimentary windows 28 formed in the indium layers 19, if utilized, facilitate pumping via diode lasers 30, in a manner which results in pumping of a substantial portion of the solid state laser medium 12, excluding the ends thereof. Thus, the windows 26, the first 20 and second 22 heat conductive members, and the corresponding windows 28 formed in the indium layers 19 are configured such that substantially all of the solid state laser medium 12, intermediate the ends thereof, are illuminated via the diode lasers 30.

According to the preferred embodiment of the present invention, the windows 26 formed in the first 20 and second 22 heat conductive members are configured to alternate, such that a given portion of the solid state laser medium 12 is pumped via a laser diode 30 through a window 26 in one of the heat conductive members 20, 22, and the adjacent portion of the solid state laser medium 12 is pumped via another laser diode 30 through windows 26 formed in the other heat conductive member 22, 20. In this manner, diode lasers 30 disposed upon opposite sides of the solid state laser medium 12 cooperate to illuminate substantially the entire solid state laser medium 12 intermediate the two ends thereof.

Optionally, mirrors 32, preferably comprised of gold, are formed upon the surfaces of the first 20 and second 22 heat conductive members opposite the window 26 formed in the opposing heat conducting members 20, 22. Similar windows 28 are then also formed in the indium layers 19. Thus, pumping radiation 34 from the diode lasers 30 which is incident upon the mirrors 32 is reflected back through the solid state laser medium 12, so as to enhance the pumping thereof.

Preferably, cylindrical lenses 36 focus the output of each diode laser 30 onto the solid state laser medium 12.

Optionally, undoped Nd: YAG windows 35 are formed to the solid state laser medium 12 so as to define the areas to be pumped and to prevent indium migration into these areas.

In operation, the four diode lasers 30 illuminate contiguous portions of the solid state laser medium 12, so as to effect lasing therein. This is accomplished by aligning each of the diode lasers 30 such that the optical axis thereof is substantially perpendicular to the optical axis of the solid state laser medium 12 and such that pumping radiation from the diode lasers 30 is transmitted through windows 26 within the first 20 and second 22 heat conductive members, as well as the windows 28 formed in the indium layers 19, if utilized. The pumping radiation 34 is reflected from surfaces 32 deposited on planar surfaces 24 in 20, 22, such that that pumping radiation not absorbed when initially transmitted through the solid state laser medium 12 has the opportunity to be absorbed by the solid state laser medium 12 when retransmitted therethrough.

Heat which builds up within the active area 14 of the solid state laser medium 12 is conducted away therefrom via the heat sinks or first 20 and second 22 heat conductive members in a manner which minimizes thermal gradients within the active area 14 of the solid state laser medium 12. By minimizing such thermal gradients within the active portion 14 of the solid state laser medium 12, focusing and depolarization of the stimulated radiation is minimized, thereby facilitating increased average output power from the slab laser assembly 10.

Figure 4:
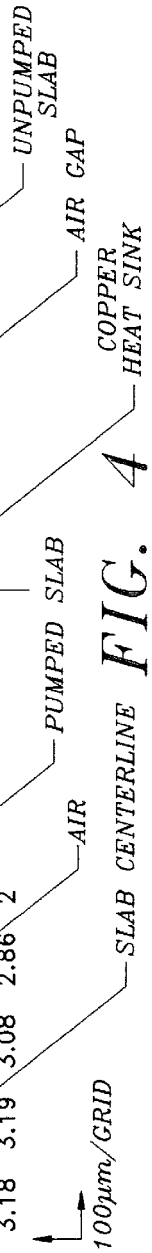
FIG. 4 is a calculated tabulation of the slab laser temperature profile under operating conditions.

Referring now to FIG. 4, a calculated temperature profile of the solid state laser medium 12 under operating conditions is provided. According to FIG. 4, within the 0.5 mm wide and 2.2 mm thick pumped region, the maximum temperature difference is 1° C. in the width direction, Dimension B, and 0.6° C. in the thickness direction, Dimension A, at 15.4 W of pump power per cm of slab length.

It is understood that the exemplary slab laser assembly described herein and shown in the drawings represents only a presently preferred embodiment of the invention. Indeed, various modifications and additions may be made to such embodiment without departing from the spirit and scope of the invention. For example, as those skilled in the art will appreciate, various different sizes, shapes, and/or configurations of the solid state laser medium are contemplated. Similarly, various different sizes, shapes, and configurations of the heat conductive members are likewise contemplated. The crucial feature of the present invention is that the heat conductive members be generally complimentary in configuration to the solid state laser medium, so as to facilitate heat flow from the solid state laser medium to the heat conductive members and also be configured such that temperature gradients within the solid state laser medium are minimized by such heat flow. Thus, these and other modifications and additions which may be obvious to those skilled in the art may be implemented to adapt the present invention for use in a variety of different applications.

What is claimed is:

1. A heat sink for slab lasers, the heat sink comprising:
   a) two heat conductive members, each heat conductive member having a generally planar surface, the two heat conductive members being configured such that a solid state laser medium is disposable therebetween while contacting the planar surfaces thereof; and
   b) at least one window formed in at least one of the heat conductive members for facilitating pumping of the solid state laser medium;
   c) wherein the two heat conductive members cause heat to be removed from the solid state laser medium in a manner which mitigates thermal focusing and depolarization of laser radiation stimulated within the solid state laser medium.

2. The heat sink for slab lasers as recited in claim 1 wherein the heat conductive members comprise metal.

3. The heat sink for slab lasers as recited in claim 1 wherein the heat conductive members comprise aluminum.

4. The heat sink for slab lasers as recited in claim 1 wherein the generally planar surface of each heat conductive member comprises a polished surface so as to enhance heat transfer at the interface thereof with the solid state laser medium.

5. The heat sink for slab lasers as recited in claim 1 further comprising a conformable, heat conductive material disposable intermediate the solid state laser medium and at least one of the heat conductive members.

6. The heat sink for slab lasers as recited in claim 1 further comprising a layer of indium disposable intermediate the solid state laser medium and at least one of the heat conductive members.

7. The heat sink for slab lasers as recited in claim 1 further comprising at least one mirrored surface formed upon at least one of the heat conductive members and configured to reflect pumping radiation transmitted through the window(s) and the solid state laser medium back through the solid state laser medium to enhance pumping thereof.

8. The heat sink for slab lasers as recited in claim 7 wherein the mirrored surface(s) comprise gold.

9. The heat sink for slab lasers as recited in claim 1 wherein the two heat conductive members are configured to facilitate heat flow through at least an active portion of the solid state laser medium in a manner which mitigates heat gradients within the active portion.

10. A slab laser comprising:

a) a solid state laser medium;

b) two heat conductive members capturing the solid state laser medium therebetween, the two heat conductive members each generally conforming to one of a pair of opposed surfaces of the solid state laser medium so as to facilitate heat transfer from the solid state laser medium to the two heat conductive members; and c) at least one window formed in at least one of the heat conductive members for facilitating pumping of the solid state laser medium;

d) wherein the two heat conductive members cause heat to be removed from the solid state laser medium in a manner which mitigates thermal focusing and depolarization of laser radiation stimulated within the solid state laser medium.

11. A method for enhancing an output of slab lasers, the method comprising the steps of:

a) pumping a solid state laser medium through at least one window formed in at least one of two heat conductive members, one heat conductive member being disposed in thermal contact with each of two generally opposed surfaces of the solid state laser medium;

b) removing heat from the solid state laser medium via the two heat conductive members; and c) wherein the two heat conductive members cause heat to be removed from the solid state laser medium in a manner which mitigates thermal focusing and depolarization of laser radiation stimulated within the solid state laser medium.

12. The method as recited in claim 11 further comprising the step of disposing a conformable, heat conductive material intermediate the solid state laser medium and at least one of the heat conductive members.

13. The method as recited in claim 11 further comprising the step of reflecting pumping radiation from at least one mirrored surface formed upon at least one of the heat conductive members such that the reflected pumping radiation is transmitted back through the solid state laser medium to enhance pumping thereof.

* * * * *